United States Patent
Riedel et al.

(10) Patent No.: US 7,219,230 B2
(45) Date of Patent: May 15, 2007

(54) OPTIMIZING COSTS ASSOCIATED WITH MANAGING ENCRYPTED DATA

(75) Inventors: Erik Riedel, San Francisco, CA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 10/140,058

(22) Filed: May 8, 2002

(65) Prior Publication Data
US 2003/0210790 A1 Nov. 13, 2003

(51) Int. Cl.
G06F 12/14 (2006.01)
H04L 9/00 (2006.01)
G06F 12/00 (2006.01)

(52) U.S. Cl. ........................... 713/165; 707/200
(58) Field of Classification Search ................ 713/165; 707/200
See application file for complete search history.

(56) References Cited

U.S. PATENT DOCUMENTS

| | | | |
|---|---|---|---|
| 5,584,022 A * | 12/1996 | Kikuchi et al. | 713/165 |
| 5,699,428 A * | 12/1997 | McDonnal et al. | 713/165 |
| 5,813,009 A * | 9/1998 | Johnson et al. | 707/100 |
| 5,918,229 A * | 6/1999 | Davis et al. | 707/10 |
| 5,953,419 A * | 9/1999 | Lohstroh et al. | 713/165 |
| 6,321,231 B1 * | 11/2001 | Jebens et al. | 707/104.1 |
| 6,986,043 B2 * | 1/2006 | Andrew et al. | 713/166 |
| 7,003,116 B2 | 2/2006 | Riedel et al. | |
| 7,039,642 B1 * | 5/2006 | Horvitz et al. | 707/100 |
| 2003/0076958 A1 * | 4/2003 | Ishiguro et al. | 380/277 |
| 2003/0081784 A1 | 5/2003 | Kallahalla et al. | |
| 2003/0081787 A1 | 5/2003 | Kallahalla et al. | |
| 2003/0081790 A1 | 5/2003 | Kallahalla et al. | |

OTHER PUBLICATIONS

K. Fu et al., "Fast and Secure Distributed Read-Only File System," OSDI, pp. 1-24, Oct. 2000.
M. Blaze, "A Cryptographic File System for Unix," Proceedings of 1st ACM Conference on Communications and Computing Security, pp. 1-8, 1993.

* cited by examiner

Primary Examiner—Kambiz Zand
Assistant Examiner—Matthew Heneghan (57) ABSTRACT

A plurality of file encryption groups are created for a plurality of files based on attributes of each file. An event is detected and a selected file encryption group is divided into a plurality of sub-groups in response to the event. The division is based on an access pattern for each file in the selected file encryption group.

39 Claims, 9 Drawing Sheets

OPTIMIZING COSTS ASSOCIATED WITH MANAGING ENCRYPTED DATA

RELATED APPLICATIONS

The following commonly assigned applications filed on Oct. 31, 2001 may contain some common disclosure and may relate to the present invention. Thus, the following applications are hereby incorporated by reference:

U.S. patent application Ser. No. 09/984,927, entitled "SYSTEM FOR ENABLING LAZY-REVOCATION THROUGH RECURSIVE KEY GENERATION" and having Publication No. 2003/0081787;

U.S. Pat. No. 7,003,116, entitled "SYSTEM FOR ENCRYPTED FILE STORAGE OPTIMIZATION VIA DIFFERENTIATED KEY SIZES";

U.S. patent application Ser. No. 09/984,926, entitled "SYSTEM FOR ENSURING DATA PRIVACY AND USER DIFFERENTIATION IN A DISTRIBUTED FILE SYSTEM" and having Publication No. 2003/0081790; and U.S. patent application Ser. No. 09/984,928, entitled "SYSTEM FOR OPTIMIZED KEY MANAGEMENT WITH FILE GROUPS" and having Publication No. 2003/0081784.

FIELD OF THE INVENTION

This invention relates generally to file system management. In particular, the invention relates to optimizing key management in a cryptographic file system.

DESCRIPTION OF THE RELATED ART

The typical file system (e.g., MICROSOFT WINDOWS, traditional UNIX, etc.) does not encrypt the data stored on the underlying data storage devices. Instead, the typical file system protects data as it is transferred between user and server. In an untrusted file server environment, the data storage devices are under the control of a third party who may not be fully trusted to protect the data or prevent malicious users from accessing, copying or using the stored data.

One solution to protecting data is for a user to encrypt the data prior to transfer to the data storage device. However, the user has the responsibility for encrypting/decrypting data and sharing the file with other users. Users may find that the personal management of the security for the file may become tiresome.

Another solution for a cryptographic file system is described in "Fast and Secure Distributed Read-Only File System," OSDI, October 2000 written by K. Fu, M. Kaashoek and D. Mazieres, which is hereby incorporated by reference in its entirety. In this cryptographic file system, a user decides on the granularity at which the keys are to be aggregated. Unfortunately, this forces a client to manage a large number of keys and the mapping of the keys to the files, which makes it difficult for a user to share files. As a result, this cryptographic file system may deter people from regularly using the system.

Yet another solution for a cryptographic file system is described in "A Cryptographic File System for UNIX," Proceedings of 1st ACM Conference on Communications and Computing Security, 1993, written by M. Blaze, which is incorporated by reference and in its entirety. In this cryptographic file system, the file system defines the groups that are used to determine a client's (or user) access control permissions. In particular, an entire directory that is to be protected is encrypted and its access permissions are determined by the UNIX permissions of the file representing that directory. However, this example of a cryptographic file system has several drawbacks. For instance, the system administrator decides the groups defined by the file system. As a result, users tend to gravitate towards making all files either universally accessible (public) or completely closed (private), effectively voiding the usefulness of the file system.

SUMMARY OF THE INVENTION

In accordance with one embodiment of the present invention, a method of implementing a file system includes creating a plurality of file encryption groups from a plurality of files. The method also includes associating each file with a respective file encryption group based on an access pattern for each file.

Another embodiment of the present invention relates to a method of optimizing costs associated with managing encrypted data. The method includes creating a plurality of file encryption groups for a plurality of files based on attributes of each file and detecting an event. The method also includes dividing a selected file encryption group into a plurality of sub-groups based on an access pattern for each file in the selected file encryption group in response to the event.

Yet another embodiment of the present invention pertains to an apparatus for optimizing costs associated with managing encrypted data. The apparatus includes means for creating a plurality of file encryption groups for a plurality of files based on attributes of each file and means for detecting an event. The apparatus also includes means for dividing a selected file encryption group into a plurality of sub-groups based on an access pattern for each file in the selected file encryption group in response to the event.

Yet another embodiment of the present invention relates to a system for optimizing a cost associated with managing encrypted data. The system includes at least one processor, a memory configured to interface with at least one processor, and a file manager module configured to be stored on the memory and executed by at least one processor. The file manager module is configured to create a plurality of file encryption groups for a plurality of files based on attributes of each file and to detect an event. The file manager module is also configured to divide a selected file encryption group into a plurality of sub-groups based on an access pattern for each file in the selected file encryption group in response to the event.

Yet another embodiment of the present invention pertains to a computer readable storage medium on which is embedded one or more computer programs. The one or more computer programs implement a method of optimizing costs associated with managing encrypted data. The one or more computer programs include a set of instructions for creating a plurality of file encryption groups from a plurality of files and associating each file with a respective file encryption group based on an access pattern for each file.

BRIEF DESCRIPTION OF THE DRAWINGS

Various features and aspects of the present invention can be more fully appreciated as the same become better understood with reference to the following detailed description of the present invention when considered in connection with the accompanying figures, in which.

DETAILED DESCRIPTION

For simplicity and illustrative purposes, the principles of the present invention are described by referring mainly to an exemplary embodiment of a file manager module. However, one of ordinary skill in the art would readily recognize that the same principles are equally applicable to, and can be implemented in, all types of systems requiring file management, and that any such variation do not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a file manager module may be utilized to manage files in a shared file system. In particular, a file manager module may provide the capability to segregate or associate files into file encryption groups. A file may be placed into a file encryption group based on the common attributes and/or file access patterns of the file with the other member of the file encryption group. The attributes may be characteristics (or parameters) that describe who has access to a file such as UNIX permission/mode bits, access control lists or other similar characteristics. Once associated with a file encryption group, the file may be encrypted with the associated cryptographic key (e.g., a symmetric encryption key, an asymmetric read/write key pair, or other similar key) of the selected file encryption group, and thus, decrypted with the associated cryptographic key (e.g., a symmetric encryption key, an asymmetric read/write key pair, or other similar key) of the selected file encryption group. A user may have membership into multiple file encryption groups as long as the user possesses the appropriate cryptographic keys, whereby group membership is indirectly determined through possession of a cryptographic key, rather than being explicitly maintained in some central database.

Moreover, the file manager module may be configured to place a file into a file encryption group based on the access pattern for that file. In particular, files may be placed into a file encryption group based on the frequency of access for the selected files, i.e., more frequently accessed files of a file encryption group may be further divided into another file encryption group. Accordingly, file encryption groups may be created for files based on attributes, access patterns or a combination thereof.

A saving in time for encryption may be realized by dividing files on the basis of the access patterns. More specifically, a selected file encryption group may be divided into sub-groups based on an event, such as revocation of a user. As an example, the files may be subdivided into two groups: a first sub-group for active files and a second sub-group for idle files. It should be readily apparent to those skilled in the art that more than two groups may be formed depending on the criteria selection used in the division of the groups. For each sub-group, a respective cryptographic key is generated. The files in each sub-group are encrypted with the respective cryptographic key. Subsequently, the cryptographic key is distributed to the users of the original selected file encryption group.

If a selected user is later revoked from the sub-group of active files, a new cryptographic key is generated and used to encrypt the files in the sub-group of the active files. The files in the other sub-group, the idle files, do not require a new encryption process since they are not being used. Thus, a savings in time for encryption may be realized since the idle files are not being re-encrypted.

In another embodiment of the present invention, the file manager module may be configured to move the files within a first sub-group into a second sub-group based on the activity for the files in the first sub-group. For example, if file X in a subgroup of active files becomes relatively inactive, the file X may be moved into a sub-group of idle files by encrypting file X with the cryptographic key associated with the sub-group of idle files.

Figure 1A:
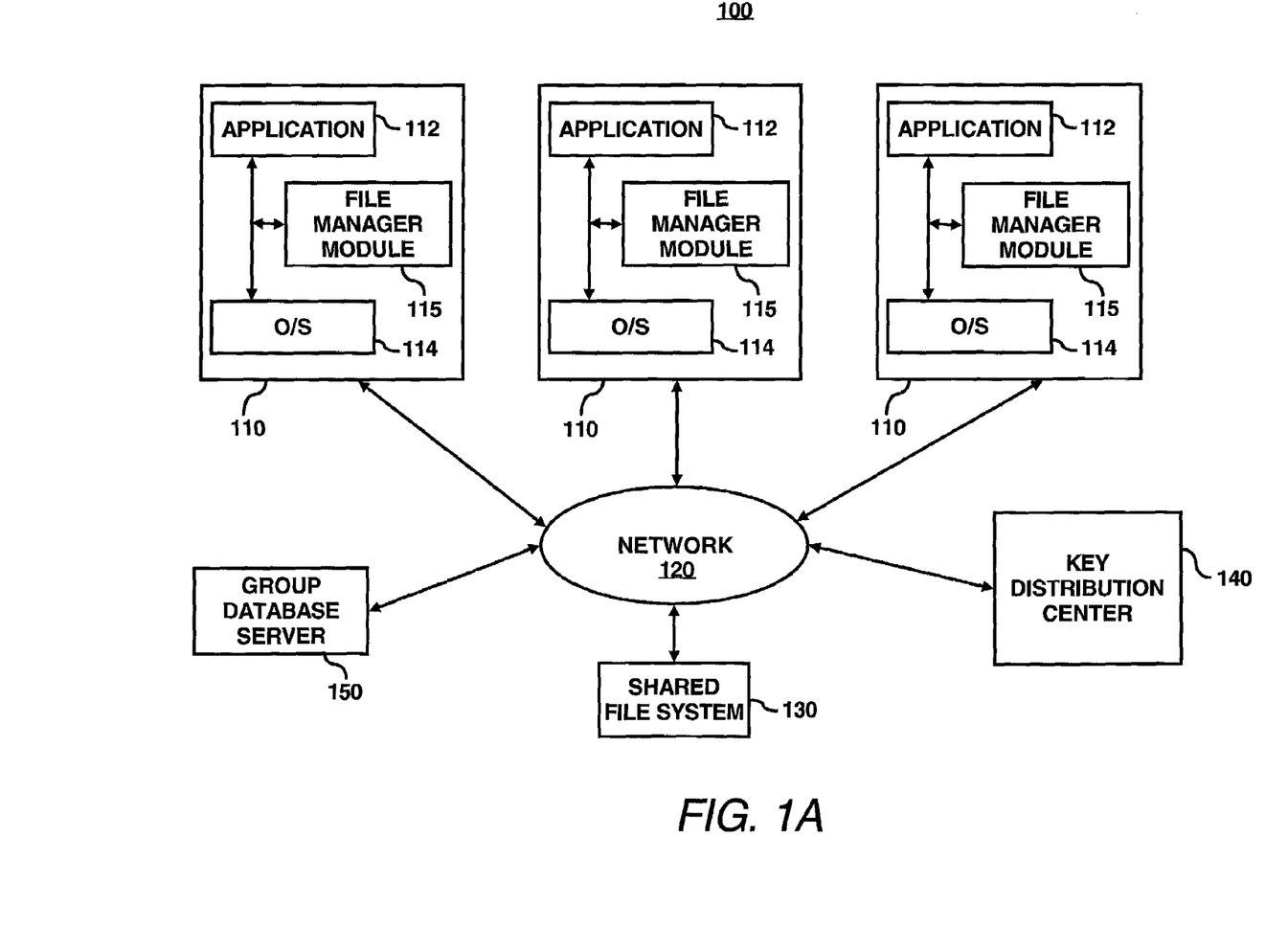
FIG. 1A illustrates a block diagram of a system utilizing an embodiment of a file manager module in accordance with the principles of the present invention.

FIG. 1A illustrates a block diagram of a system 100 where an embodiment of the present invention may be practiced. As shown in FIG. 1A, the system 100 includes user stations 110, a network 120, and a shared file system 130.

The user stations 110 of the system 100 may be configured to provide access to computer software applications and/or data. The user stations 110 may be implemented by a personal computer, a laptop computer, a workstation, a portable wireless device, and other similar computing devices.

Each user station 110 may include an application 112, an operating system 114 and a file manager module 115. Although FIG. 1A illustrates an exemplary embodiment of the architecture for the user station 110, it should be readily apparent to those of ordinary skill in the art that FIG. 1A represents a generalized illustration of the user station 110 and that other components may be added or existing components may be removed without departing from the spirit or scope of the present invention.

The application 112 may be a computer program that is executed on the user station 110. The application 112 may be a word processing program, a spreadsheet program or any other type of program that generates files to be stored in the shared file system 130. The application 112 may be interfaced with the operating system 114 through an application program interface (API, not shown). The operating system 114 may be configured to manage the software applications, data and respective hardware components (e.g., displays, disk drives, etc.) of the user station 110. The operating system 114 may be implemented by MICROSOFT WINDOWS family of operating systems, UNIX operating systems, HEWLETT-PACKARD HP-UX operating systems, LINUX operating systems, RIM OS operating systems, and other similar operating systems.

The operating system 114 of the user station 110 may be configured to interface with the file manager module 115. The file manager module 115 may be configured to provide the capability of grouping files into file encryption groups based on a set of attributes associated with the file, access patterns associated with the file, or a combination of the attributes and access patterns. The attributes may be characteristics/parameters that describe who has access to a file such as UNIX operating system permission/mode bits (group-read/write/executable bit, owner-read/write/executable bits, users-read/write/executable bits). The access patterns may be metrics such as frequency of reads, frequency of writes or other similar characteristics.

The file manager module 115 may be implemented as a software program, a utility, a subroutine, or other similar programming entity. In this respect, the file manager module 115 may be programmed using software languages such as C, C++, JAVA, etc. Alternatively, the file manager module 115 may be implemented as an electronic device utilizing an application specific integrated circuit, discrete components, solid-state components or combination thereof.

Figure 1B:
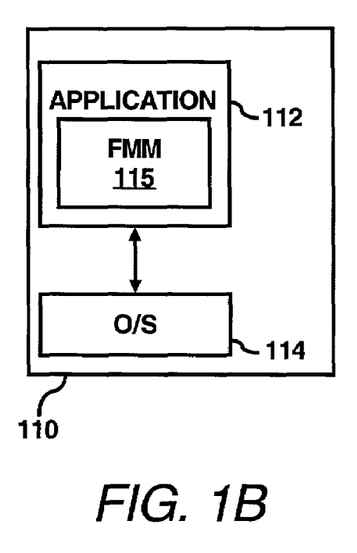
FIGS. 1B–D respectively illustrate other embodiments of the present invention.

Although the file manager module 115 is shown interfaced between the application 112 and the operating system 114, the file manager module 115 (labeled 'FMM' in FIG. 1B) may be integrated into a software application as illustrated in FIG. 1B in accordance with another embodiment of the present invention. As shown in FIG. 1B, the client 110 may provide the operating system 114 and application 112 for a user. In this embodiment of the invention, the functionality of the file manager module 115 is integrated with the application 112.

Figure 1C:
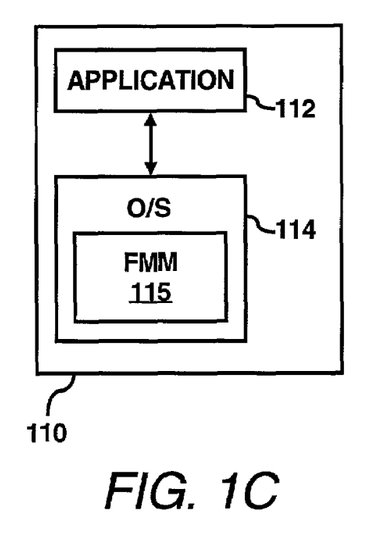
Figure 1D:
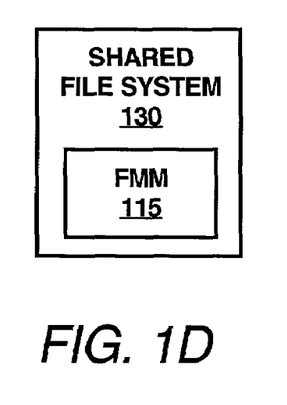

Similarly, in FIG. 1C, the client 110 provides for the operating system 114 and application 112 for a user. However, the functionality of the file manager module 115 (labeled 'FMM' in FIG. 1C) is now integrated with the operating system 114 in accordance with another embodiment of the invention. The file manager module 115 may be utility, a device driver or other similar programming construct. Moreover, as shown in FIG. 1D, the file manager module 115 (labeled 'FMM' in FIG. 1D) is shown integrated with shared file system 130 in accordance with yet another embodiment of the present invention. Thus, it should be readily apparent to those skilled in the art that an embodiment of the file manager module 115 may be implemented with any type of computing device in the system 100.

The user stations 110 may be further configured to interface with the network 120 through a respective network interface (not shown). The network 120 may be configured to provide a communication channel between each user station 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX network protocol, IEEE 801.11 b, and other similar network protocols.

The shared file system 130 may be configured to provide storage of data and/or software applications for the system 100. The shared file system 130 may be a network accessible disk drive, a federated system with a distributed file service or other similar device.

Optionally, the system 100 may include a key distribution center 140 and a group database server 150. The key distribution center 140 may be configured to provide a secure method of transferring encryption/decryption keys within the system 100. The group database server 150 may be configured to provide central access to the user of the system 100 for information related to file encryption groups. In one contemplated embodiment, the group database server 150 may store a file encryption group table that is configured to provide a listing of encryption keys (or pointers to encryption keys) and respective file encryption groups. The file encryption group may be defined in terms of the common attributes of the files contained in the file encryption group, for example, as shown in the following TABLE I:

TABLE I

| owner | group | mode bits | key |
|-------|-------|-----------|-----|
| User1 | Group I | rw-r--r-- | K1 |
| User1 | Group I | rw-rw-r-- | K2 |
| User2 | Group I | rw-rw-r-- | K3 |
| User2 | Group II | rwxrwxr-x | K4 |

In accordance with one embodiment of the present invention, an owner may create a file utilizing user station 110. The file manager module 115 may be configured to detect the file creation command from the application 112 to the operating system 114. The operating system may assign a set of default attributes to the newly created file based on the attributes of the file owner. The file manager module 115 may be also configured to search a file encryption group table to search for a corresponding cryptographic key based on the set of default attributes. If the corresponding cryptographic key (e.g., a symmetric key, an asymmetric read/write key pair, etc.) is found (and thereby associating the file with an associated file encryption group), the file manager module 115 may be further configured to encrypt the file with the corresponding cryptographic key of the selected file encryption group and forward the encrypted data for storage in the shared file system 130 (or other memory devices local or remote).

In accordance with another embodiment of the present invention, an owner may modify attributes (e.g., UNIX operating system file permissions: group-read/write/executable bits, user-read/write/executable bits, and owner-read/write/executable bits) of a selected file. Alternatively, for a system using access control lists (ACLs) such as the Andrew File System (AFS) or an WINDOWS NT operating system, the owner may modify an associated ACL for the selected file.

The file manager module 115 may be configured to determine whether the changed attributes may be associated with an existing file encryption group. If an existing file encryption group exists, the file manager module may be also configured to retrieve the corresponding write key for the existing file encryption group as well as the corresponding read key for the current file encryption group of the file. The file manager module may be further configured to decrypt the encrypted file with the read key and re-encrypt the file with the corresponding write key of the existing file encryption group.

Subsequently, the file manager module may update the file encryption group table. In one contemplated embodiment, the file manager module may be configured to maintain the file encryption group table on the user station 110. The file manager module 115 may refer to the file encryption group table to determine which the association between encryption keys and file encryption groups. In another contemplated embodiment, the file manager module may be configured to maintain the file encryption group table in a central location such as the group database server 150. The group database server 150 may be configured to provide a central location for all users of the system 100 to determine which file encryption group a particular file belongs.

In yet another embodiment of the present invention, the file manager module 115 may be configured to optimize a selected file encryption group, where the selected file encryption group is associated with a certain set of users. In particular, the file manager module 115 may divide the files in the selected file encryption group into sub-groups in response to a revocation event, i.e., a revocation of a user of the selected file encryption group. The file manager module 115 may, for example, use file access frequency as a basis to subdivide the files into individual subgroups. In one embodiment of the present invention, the files are divided into two sub-groups: active and idle. In another embodiment, the files may be divided into multiple sub-groups: very active, active, mostly idle, and idle. It should be readily apparent to those skilled in the art that any number of sub-groups may be created.

The file manager module 115 may be configured to generate a cryptographic key for each sub-group. The file manager module 115 may encrypt the files that meet the selection criteria for a selected sub-group may be encrypted with the respective cryptographic key, e.g., an active file is encrypted with the cryptographic key of the active file sub-group. The cryptographic keys are then distributed to the group of the users. Subsequently, if another user is revoked from the active file sub-group, for example, a new cryptographic key is generated for the active file sub-group and the key re-encrypts the files associated with the active file sub-group. In this respect, the files associated with the other sub-groups are not re-encrypted when the user is revoked, thereby inducing a savings in processor resources.

Figure 2:
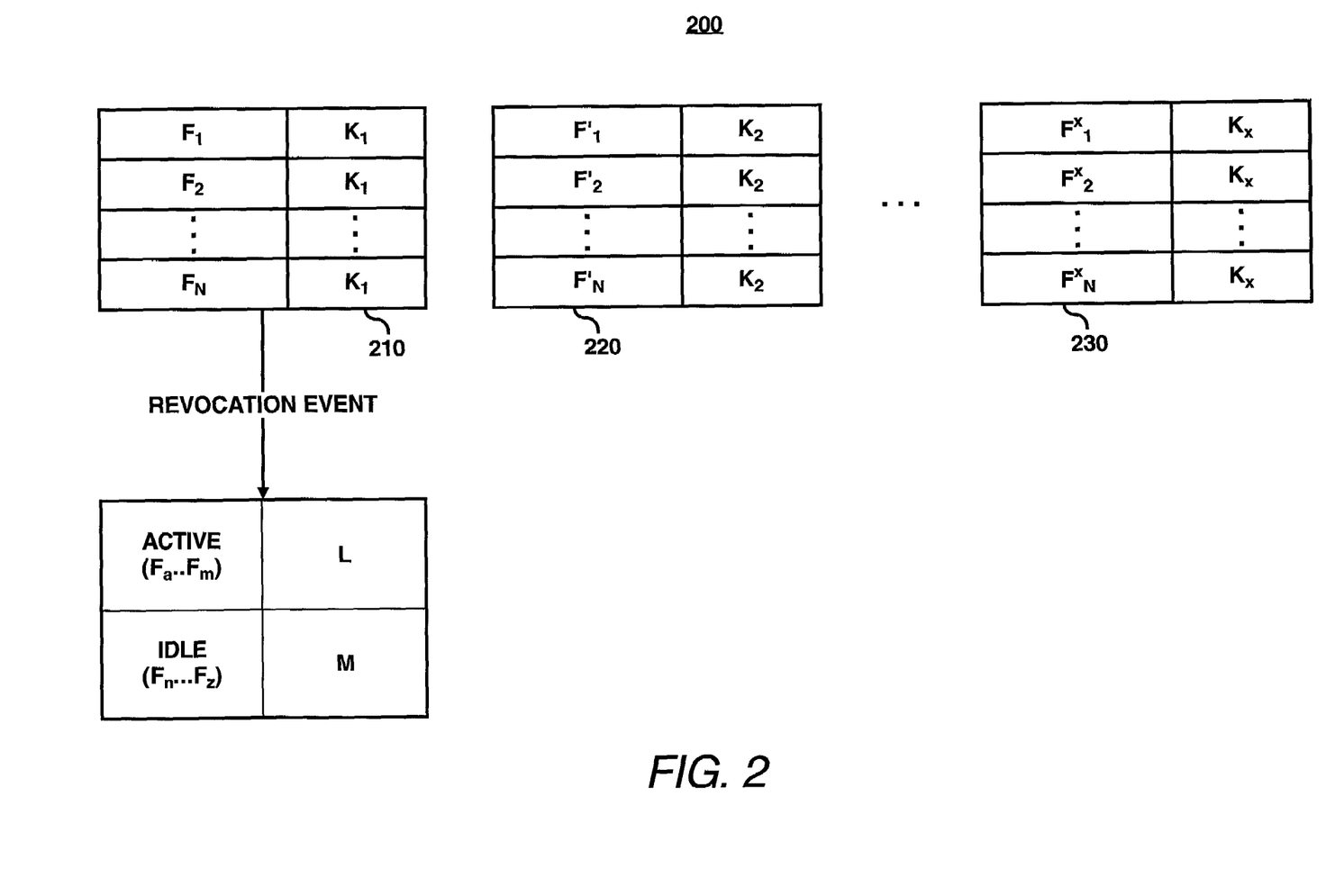
FIG. 2 illustrates an exemplary diagram of a file structure organized by the file manager module shown in FIG. 1A in accordance with an embodiment of the present invention.

FIG. 2 illustrates an exemplary diagram of a file structure 200 organized by the file manager module shown in FIG. 1A in accordance with an embodiment of the present invention. As shown in FIG. 2, a file encryption group 210 may include a plurality of files $F_1 \ldots F_N$, where each file has been encrypted with the same key, $K_1$. A file encryption group 220 may comprise a plurality of files $F'_1 \ldots F'_N$ where each file has been encrypted with the key, $K_2$ as well as file encryption group 230 may contain a plurality of files $F^X_1 \ldots F^X_N$, where each file has been encrypted with the key, $K_X$.

Each file encryption group, 210–230 may include a variety of files created by various owners of files. Each file is placed into their respective file encryption group, 210–230, based on the attributes of each file. Access may be granted to each file encryption group, 210–230, based on the possession of the respective key of each of the file encryption groups 210–230. File owners may affect a file membership into file encryption groups 210–230 by modifying the attributes of a selected file.

With respect to file encryption group 210, a revocation event has been detected by a file manager module (e.g., file manager 115 in FIG. 1A). The file manager module 115 has subdivided into two sub-groups: active and idle. The active sub-group is encrypted with cryptographic key L and the idle sub-group is encrypted with cryptographic key M. The users associated with file encryption group 210 are distributed cryptographic keys L and M.

Figure 3:
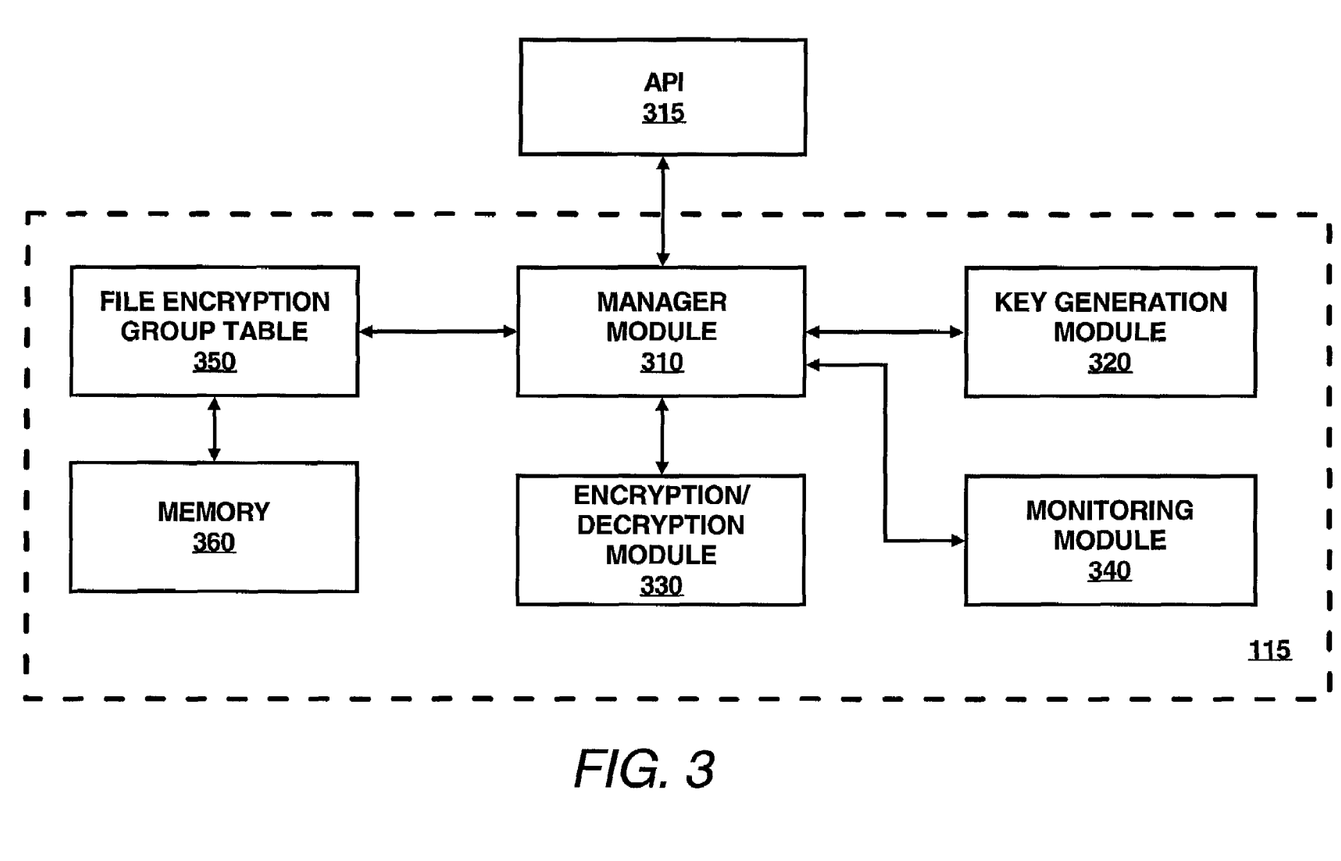
FIG. 3 illustrates a diagram of an exemplary architecture of the file manager module shown in FIG. 1A in accordance with an embodiment of the present invention.

FIG. 3 illustrates a diagram of an exemplary architecture of the file manager module 115 shown in FIG. 1A in accordance with an embodiment of the present invention. Although, for illustrative purposes only, FIG. 3 illustrates an exemplary embodiment of the file manager module 115, it should be readily apparent to those of ordinary skill in the art that FIG. 3 represents a generalized illustration of the file manager module 115 and that other components may be added or existing components may be removed without departing from the spirit or scope of the present invention. Moreover, since FIG. 3 illustrates an exemplary embodiment of the file manager module 115, where the file manager module 115 may be implemented as a hardware embodiment, a software embodiment, and/or combination thereof and such embodiments are well within the scope and spirit of the present invention.

As shown in FIG. 3, the file manager module 115 includes a manager module 310, a key generation module 320, an encryption/decryption module 330, and a monitoring module 340. The manager module 310 may be configured to provide management functions for the file manager module 115. For example, the manager module 310 may be configured to detect a file creation event and/or an attribute-changing event by monitoring an API 315 between the application 112 and the operating system. The manager module 310 may be also configured to determine which file encryption group a file belongs in response to a file attribute change event and to divide the files of a file encryption group into sub-groups based on access patterns. Further details of the functionality of the manager module 115 may be explained in fuller detail herein below in conjunction with FIGS. 4 and 5.

The manager module 310 may be further configured to interface with the key generation module 320. The key generation module 320 may be configured to generate single keys or read/write key pairs for a new file encryption group. The key generation module 320 may create randomly-generated keys for use in symmetric cryptographic algorithms such as DES, AES, etc., or key pairs via asymmetric cryptographic algorithms such as RSA, El-Gamal, McEliece, Cramer-Shoup, etc.

The manager module 310 may be further configured to interface with the encryption/decryption module 330. The encryption/decryption module 330 may be configured to provide encryption and decryption services to the file manager module 115. In particular, the encryption/decryption module 330 may encode files belonging to a particular file encryption group with the appropriate encryption (e.g., a write) key. The encryption/decryption module 330 may also decode the encrypted files with a complementary decryption (or read key) for an authorized viewer to access the file.

The manager module 310 may be further configured to interface with a monitoring module 340. The monitoring module 340 may be configured to monitor metrics associated with the files in the file encryption groups. The metrics may include read access frequency, write access frequency, common access, revocation patterns, or other similar characteristics. In an alternative embodiment, the metrics may be stored in a central location (e.g., a disk file controller) to be accessed by the manager module.

The manager module 310 may be further configured to interface with an optional file encryption group table 350. In one contemplated embodiment, the file encryption group table 340 may be configured to provide a listing of encryption keys and their associated file encryption groups. The file encryption group table 350 may be implemented as a table, a data structure linked-list or other similar storage structure. The manager module 310 may search the file encryption group table 350 in order to determine if a file encryption group has an existing encryption key. In another contemplated embodiment, the file encryption group table 350 may be optionally located in a central location such as the group database server 150 (shown in FIG. 1A). The manager module 310 may communicate with the group database server 150 for a determination of an existing file encryption group for the file over the network 130 utilizing network communication protocols such as Ethernet, local area network, TCP/IP, etc.

The file encryption group table 350 may be implemented with a memory such as dynamic random access memory, flash memory or other non-persistent memories. The file encryption group table 350 may be optionally configured with a memory access device such as a floppy disk drive, smart card, a memory stick or other persistent memories. In this manner, the file encryption group table 350 may be stored on the medium of the memory device 360. Subsequently, the medium may be stored in a secure location (e.g., a vault or locked desk drawer).

Figure 4:
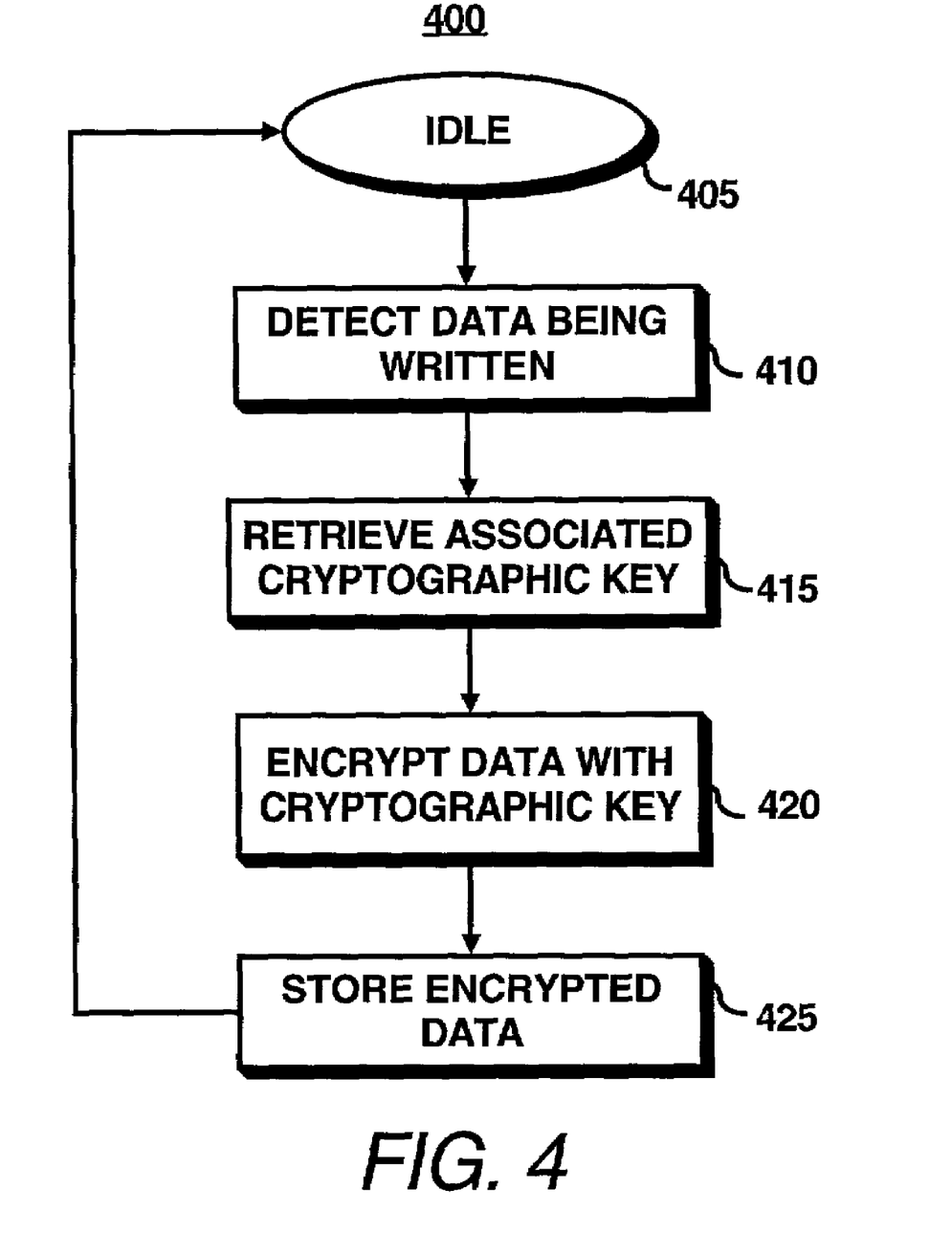
FIG. 4 illustrates an exemplary flow diagram for an operational mode of the file manager module shown in FIGS. 1A and 3 in accordance with an embodiment of the present invention.

FIG. 4 illustrates an exemplary flow diagram 400 for an operational mode of the file manager module 115 shown in FIGS. 1 and 3 in accordance with an embodiment of the present invention. Although FIG. 4 illustrates a flow diagram for the file manager module 115 with the following steps, it should be readily apparent to those of ordinary skill in the art that FIG. 4 represents a generalized illustration of an embodiment of the file manager module 115 and that other steps may be added or existing steps may be removed without departing from the spirit or scope of the present invention.

As shown in FIG. 4, in step 405, the manager module 115 may be configured to be in idle state monitoring the API 315. In step 410, the manager module 310 may detect a data being written, i.e., a file being created. The operating system 114 may be configured to assign a set of default attributes based on the attributes of the file owner.

In step 415, the manager module 310 may be configured to retrieve a cryptographic key based on the set of default attributes. In particular, the manager module 310 may search the file encryption group table 350 for the associated cryptographic key (e.g., a symmetric key, an asymmetric read/write key pair, etc.) for the file encryption group 340 that is defined by the set of default attributes. Typically, the file owner may supply the associated cryptographic key when the file owner's user account was created. Accordingly, the newly created file may be associated with a file encryption group that may define by the set of default attributes of the file owner.

In step 420, the manager module 310 may be configured to forward the associated cryptographic key and the newly created file to the encryption/decryption module 330. The encryption/decryption module 330 may be configured to encrypt the newly created file with the associated cryptographic key.

In step 425, the manager module 310 may be configured to forward the encrypted file to the operating system 114 for storage. In step 430, the manager module 310 may be configured to post-process the associated cryptographic key. Subsequently, the manager module 310 may be configured to return to the idle state of 405.

Figure 5:
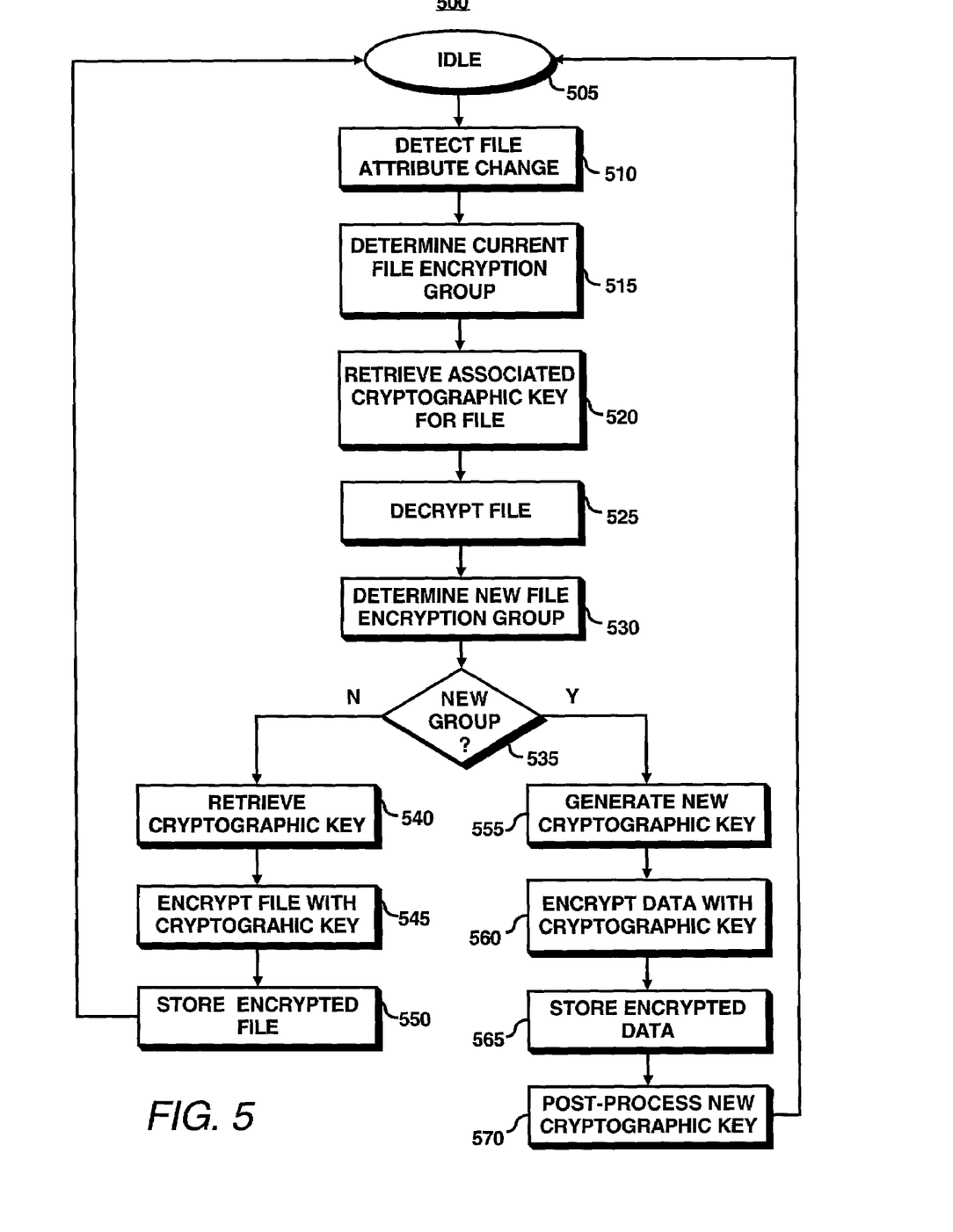
FIG. 5 illustrates an exemplary flow diagram for a second operational mode of the file manager module shown in FIGS. 1A and 3 in accordance with an embodiment of the present invention.

FIG. 5 illustrates an exemplary flow diagram 500 for another operational mode of the file manager module 115 shown in FIGS. 1 and 3 in accordance with an embodiment of the present invention. Although, for illustrative purposes only, FIG. 5 illustrates a flow diagram for the file manager module 115 with the following steps, it should be readily apparent to those of ordinary skill in the art that FIG. 5 represents a generalized illustration of an embodiment of the file manager module 115 and that other steps may be added or existing steps may be removed or modified without departing from the spirit or scope of the present invention.

As shown in FIG. 5, in step 505, the manager module 310 of the file manager module 115 may be configured to be in an idle state. The manager module 310 may monitor the message traffic between the application 112 and the operating system 114 by utilizing the API 315.

In step 510, the manager module 310 may be configured to detect an attribute change in a file (e.g., an owner/user has modified the group read permission for the file). The manager module 310 may be also configured to determine the current file encryption group that the file belongs, in step 515. In particular, the manager module 310 may retrieve the current attributes of the file and use the current attributes as an index into the file encryption group table 350 to retrieve the associated cryptographic key (e.g., a symmetric key, a read key of an asymmetric read/write key pair, etc.) for the selected file in step 520.

In step 525, the manager module 310 may be configured to forward the associated cryptographic key and the selected encrypted file to the encryption/decryption module 330, which decrypts the selected encrypted file with the associated cryptographic key.

In step 530, the manager module 310 may be configured to determine whether the changed attributes belong to a new file encryption group by utilizing the changed attributes as index into the file encryption group table 350. If, in step 535, the changed attributes indicate an existing file encryption group, the manager module 310 may be further configured to retrieve the cryptographic key of the existing file encryption group from the file encryption group table 350, in step 540. The manager module 310 may be yet further configured to encrypt the file with the retrieved cryptographic key of the existing file encryption group, in step 545 and store the encrypted file in the shared file system 130, in step 550.

Returning to step 535, if the manager module 310 determines that the changed attributed indicate a new group, the manager module 310 may initiate a new cryptographic key (e.g., a symmetric key, an asymmetric read/write key pair, etc.) generation from the key generation module 320, in step 555.

In step 560, the manager module 310 may be configured to forward the newly generated cryptographic key and the file to the encryption/decryption module 330, which encrypts the file with the new cryptographic key. In step 565, the manager module 310 may be also configured to forward the encrypted file to the operating system 114 for storage on the shared file system 130.

In step 570, the manager module 310 may be configured to post process the new cryptographic key. More particularly, the manager module 310 may update the file encryption group table 350 with the new cryptographic key and the associated file encryption group. The manager module 310 may also store the respective cryptographic key in the file encryption group table 350.

It is contemplated that the file encryption group table 350 may be implemented with the file manager module 115 on a user station 110. However, it is also contemplated that the file encryption group table 350 may be also implemented in a central location of the system 100 such as a group database server 150.

Figure 6:
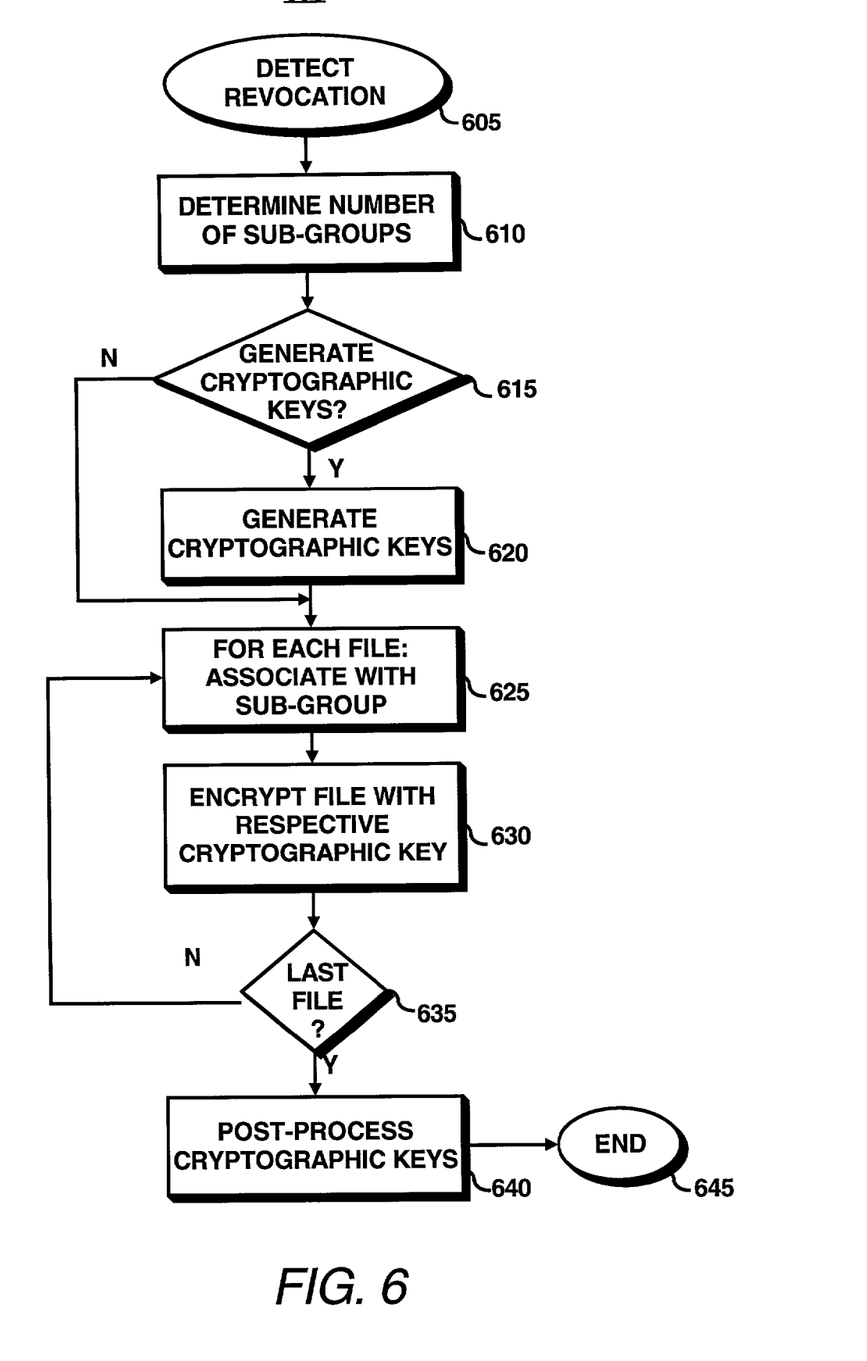
FIG. 6 illustrates an exemplary flow diagram for another operational mode of the file manager module shown in FIGS. 1A and 3 in accordance with an embodiment of the present invention.

FIG. 6 illustrates an exemplary flow diagram 600 for yet another operational mode of the file manager module 115 shown in FIGS. 1 and 3 in accordance with an embodiment of the present invention. Although FIG. 6 illustrates a flow diagram for the file manager module 115 with the following steps, it should be readily apparent to those of ordinary skill in the art that FIG. 6 represents a generalized illustration of an embodiment of the file manager module 115 and that other steps may be added or existing steps may be removed or modified without departing from the spirit or scope of the present invention.

As shown in FIG. 6, the file manager module 115 may detect a revocation event in a file encryption group, i.e., a user being revoked from the group, through the API 315, in step 605. Alternatively, the file manager module 115 may receive a command, a signal or other similar indication that a user has been revoked for a selected file encryption group.

In step 610, the manager module 110 of the file manager module 115 may be configured to determine the number of sub-groups to divide the selected file encryption group. A user may specify the criteria to divide the files in the selected file encryption group. For example, a user may specify write access frequency as a criterion for division. Alternatively, a user may create sub-groups based on relative activity such as idle, mostly idle, mostly active, and active. Although criteria based on access pattern is contemplated in one embodiment of the present invention, it should be readily apparent that other selection criteria such as revocation patterns, user-specified levels of importance, etc., are also within the scope and spirit of the present invention.

In step 615, the manager module 310 may be configured to determine whether to generate new cryptographic keys. More particularly, the manager module 310 may determine that it is permissible to re-use the same cryptographic key and then proceed to the processing of step 625. Otherwise, the manager module, in step 620, may be configured to invoke the key generation module 320 to generate cryptographic keys (e.g., a symmetric key, an asymmetric read/write key pair, etc.) for the number of sub-groups determined in step 610.

In step 625, the manager module 310 may be configured to associate each file with a sub-group. More particularly, the manager module 310 may compare an associated metric of the selected file with the user-specified criteria determined in step 610. Subsequently, the manager module 310 may determine the appropriate sub-group for the file.

In step 630, the manager module 310 may be configured to encrypt the file with the respective cryptographic key of the selected sub-group by invoking the encryption/decryption module 330. Subsequently, in step 635, the manager module 310 may be configured to determine whether the last file in the selected file encryption group has been analyzed. If it is determined that additional files are to be analyzed, the manager module 310 may return to the processing of step 625.

Otherwise, in step 640, the manager module 310 may be configured to post-process the generated cryptographic keys. More particularly, the manager module 310 may update the file encryption group table 350 with the new cryptographic keys and the associated sub-groups as new file encryption groups. The manager module 310 may also store the respective cryptographic key in the file encryption group table 350. Subsequently, the manager module 310 may terminate operation, step 645.

Figure 7:
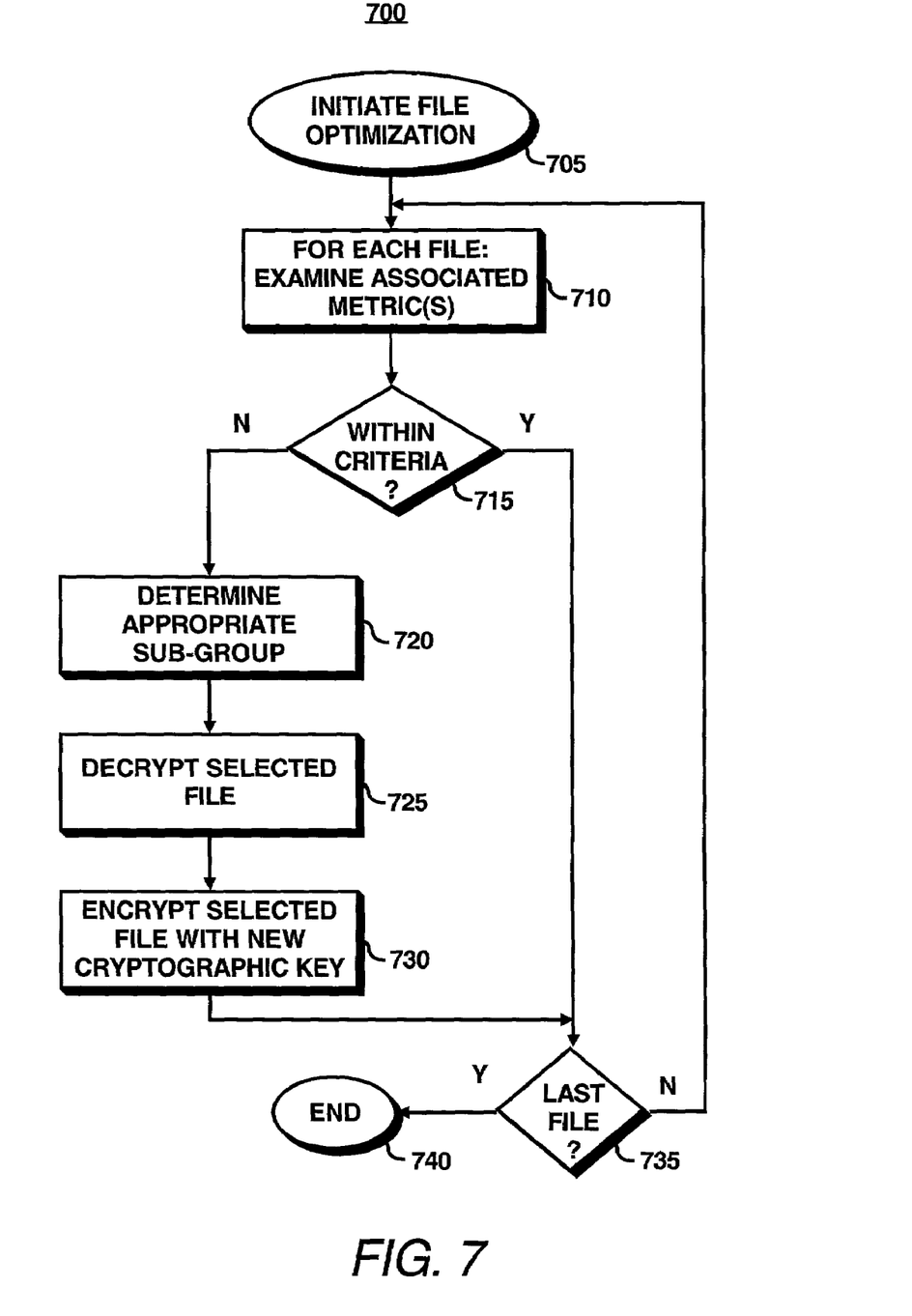
FIG. 7 illustrates an exemplary flow diagram for yet another operational mode of the file manager module shown in FIGS. 1A and 3 in accordance with an embodiment of the present invention.

FIG. 7 illustrates an exemplary flow diagram 700 for yet another operational mode of the file manager module 115 shown in FIGS. 1 and 3 in accordance with an embodiment of the present invention. Although FIG. 7 illustrates a flow diagram for the file manager module 115 with the following steps, it should be readily apparent to those of ordinary skill in the art that FIG. 7 represents a generalized illustration of an embodiment of the file manager module 115 and that other steps may be added or existing steps may be removed or modified without departing from the spirit or scope of the present invention.

As shown in FIG. 7, the manager module 310 of the file manager module 115 may be configured to detect an invocation of a file optimization mode through the API 315, in step 705. The invocation may be implemented through a command, a signal, a function call or other similar technique.

In step 710, the manager module 310 may be configured to compare an associated metric of the file with the user-specified criteria used to create the sub-groups. If the comparison reveals that the associated metric fails to meet the user-specified criteria, in step 715, the manager module 310 may be configured to determine the appropriate sub-group for the selected file, in step 720. Otherwise, if the comparison reveals that the associated metric meets the user-specified criteria, the manager module 310 may be configured to proceed to the processing of step 735, which is described in greater detail below.

In step 725, the manager module 310 may be configured to decrypt the selected file with a complementary cryptographic key of the sub-group using the encryption/decryption module 330. Subsequently, in step 730, the selected file is encrypted with the cryptographic key of the new sub-group.

In step 735, the manager module 310 may be configured to determine whether additional files are to be examined. If there are additional files, the manager module 310 may return to the processing of step 710. Otherwise, the manager module 310 may terminate, in step 740.

Figure 8:
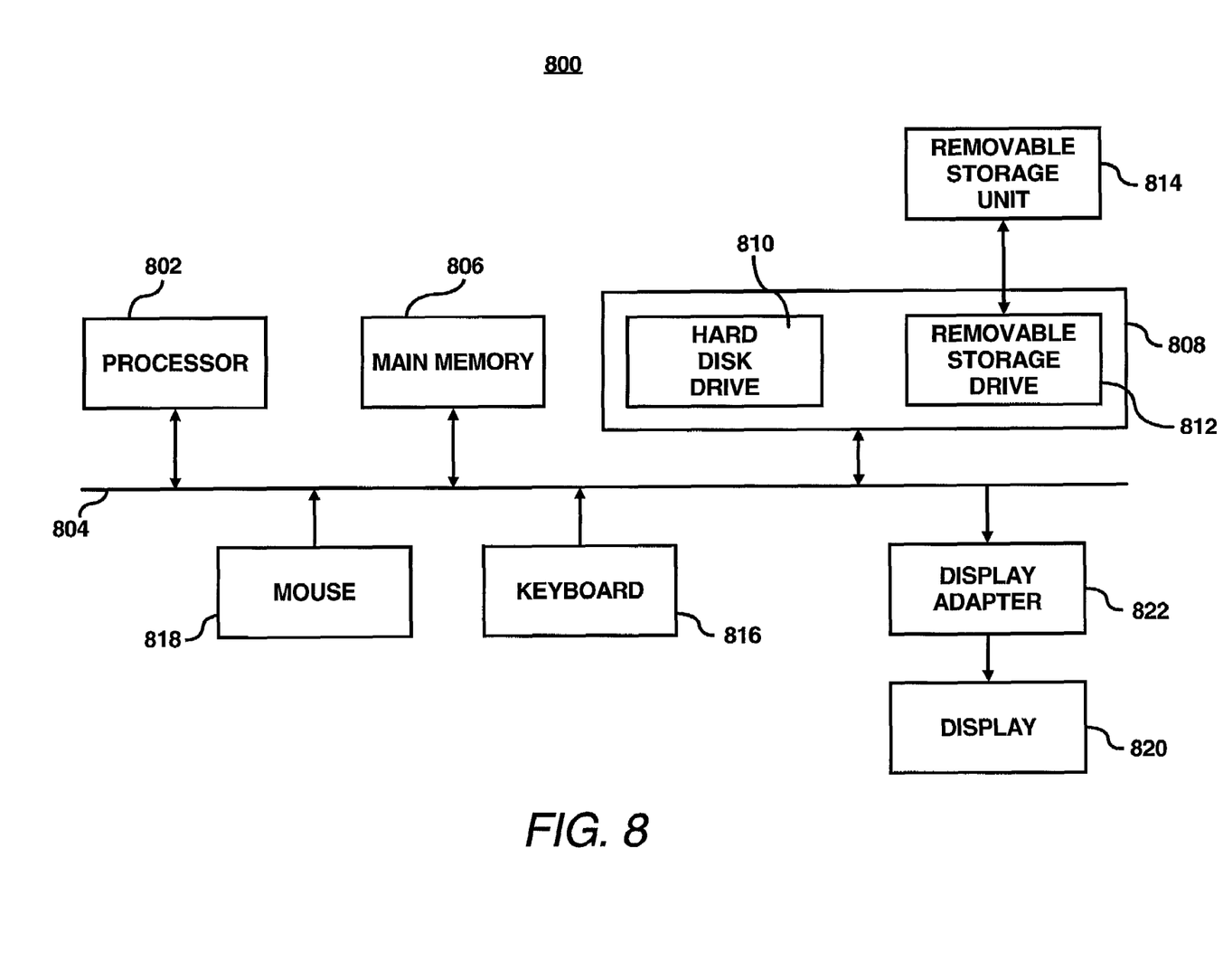
FIG. 8 illustrates an exemplary block diagram of a computer system where an embodiment of the present invention may be practiced.

FIG. 8 illustrates an exemplary block diagram of a computer platform 800 where an embodiment of the present invention may be practiced. As shown in FIG. 8, the computing platform 800 includes one or more processors, such as processor 802 that provides an execution platform for the file manager module 115. Commands and data from the processor 802 are communicated over a communication bus 804. The computing platform 800 also includes a main memory 806, preferably Random Access Memory (RAM), where the software for the file manager module 115 may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of software for the security module 115 may be stored. The removable storage drive 812 reads from and/or writes to a removable storage unit 814 in a well-known manner. A user interfaces with the file manager module 115 with a keyboard 816, a mouse 818, and a display 820. The display adaptor 822 interfaces with the communication bus 804 to receive display data from the processor 802 and converts the display data into display commands for the display 820.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method executable in at least one computing device of optimizing costs associated with managing encrypted data, said method comprising:
    creating a plurality of file encryption groups for a plurality of files based on attributes of each file;
    detecting an event; and
    in response to the event, dividing a selected file encryption group into a plurality of sub-groups of files in the selected file encryption group based on access patterns for the files in said selected file encryption group.

2. The method according to claim 1, wherein said event is a revocation of a user.

3. The method according to claim 1, further comprising:
    generating a plurality of encryption keys; and
    associating each encryption key with a respective file encryption group of said plurality of file encryption groups, wherein each encryption key encrypts each of multiple files in said respective file encryption group of said plurality of file encryption groups.

4. The method according to claim 1, further comprising:
    generating a plurality of encryption keys; and
    associating each encryption key with a respective sub-group from said plurality of sub-groups.

5. The method according to claim 4, further comprising:
    encrypting each file in each sub-group of said plurality of sub-groups with a respective encryption key.

6. The method according to claim 4, further comprising:
    moving a file from a first sub-group to a second sub-group based on a change in an access pattern for said file.

7. The method according to claim 1, further comprising:
    moving a file from a first sub-group to a second sub-group based on a change in an access pattern for said file.

8. The method of claim 1, wherein dividing the selected file encryption group into the plurality of sub-groups based on the access patterns for the files in the selected tile encryption group comprises dividing the selected file encryption group into the plurality of sub-groups based on frequencies of access for the files in the selected file encryption group.

9. An apparatus for optimizing costs associated with managing encrypted data, said apparatus comprising:
    at least one processor;
    means coupled to the at least one processor for creating a plurality of file encryption groups for a plurality of files based on attributes of each file;
    means coupled to the at least one processor for detecting an event; and
    means coupled to the at least one processor and responsive to the event for dividing a selected file encryption group into a plurality of sub-groups of files in the selected file encryption group based on access patterns for the files in said selected file encryption group.

10. The apparatus according to claim 9, further comprising:
    means for generating a plurality of encryption keys; and
    means for associating each encryption key with a respective tile encryption group of said plurality of file encryption groups, wherein each encryption key encrypts each of the files in said respective file encryption group of said plurality of file encryption groups.

11. The apparatus according to claim 9, further comprising:
    means for generating a plurality of encryption keys; and
    means for associating each encryption key with a respective sub-group from said plurality of sub-groups.

12. The apparatus according to claim 9, further comprising:
    means for moving a file from a first sub-group to a second sub-group based on a change in access pattern far said file.

13. A system for optimizing costs associated with managing encrypted data, said system comprising:
    at least one processor;
    a memory configured to interface with said at least one processor; and
    a file manager module configured to be stored on said memory and executed by said at least one processor; wherein said tile manager module is configured to create a plurality of file encryption groups for a plurality of files based on attributes of each file, to detect an event, and to divide a selected file encryption group into a plurality of sub-groups based on an access pattern for each file in said selected tile encryption group in response to said event.

14. The system according to claim 13, further comprising:
    a key generation module, wherein said file manager module is further configured to invoke said key generation module to generate a plurality of cryptographic keys and to associate each cryptographic key with a respective file encryption group,
    the file manager module to use one of the cryptographic keys to encrypt files of a respective file encryption group.

15. The system according to claim 14, wherein said file manager module is further configured to invoice said key generation module to generate a plurality of cryptographic keys and to associate each cryptographic key with each sub-group of said plurality of sub-groups.

16. The system according to claim 13, wherein said file manager module is further configured to use each of plural cryptographic keys to encrypt each of the files in a respective file encryption group.

17. The system according to claim 13, wherein said file manager module is adapted to execute in an application program.

18. The system according to claim 13, wherein said file manager module is configured to be integrated in an operating system.

19. The system according to claim 13, wherein said file manager module is configured to be integrated in a shared tile system.

20. The system of claim 13, wherein the access pattern for each file comprises a frequency of access for each file, the files of the selected encryption group divided into the plurality of sub-groups based on the frequencies of access of the files.

21. A method executable by at least one computing device of implementing a file system, comprising:
creating a plurality of file encryption groups from a plurality of files;
associating each file with a respective file encryption group based on an access pattern for each file;
associating each file encryption group of said plurality of file encryption groups with a respective encryption key, wherein each file encryption group has multiple files; and
accessing the files in each file encryption group by utilizing said respective encryption key,
wherein creating the plurality of file encryption groups, associating each file with a respective file encryption group, associating each file encryption group with a respective encryption key, and accessing the files in each file encryption group are performed by a file manager module in a user station.

22. The method according to claim 21, further comprising:
encrypting each file in each file encryption group of said plurality of file encryption groups with said respective encryption key; and
storing said encrypted files of said plurality of file encryption groups.

23. The method according to claim 21, further comprising:
detecting an event; and
dividing files of a selected encryption group into a plurality of sub-groups based on file access patterns for said files of said selected file encryption group.

24. The method according to claim 23, further comprising:
generating a respective encryption sub-key for each sub-group of said plurality of sub-groups; and
encrypting each of the files of each sub-group with the respective encryption sub-key.

25. The method according to claim 24, further comprising:
maintaining said respective encryption key of said selected file encryption group for a sub-group with an access pattern of little activity.

26. The method according to claim 23, further comprising:
moving a file from one sub-group to a second sub-group based on a change in level of activity of said file.

27. The method according to claim 26, wherein said change is an increase in activity.

28. The method according to claim 26, wherein said change is a decrease in activity.

29. The method according to claim 21, further comprising:
disassociating a file from a first file encryption group based on a change in a respective file access pattern; and
associating said file with a second file encryption group based on said change in said respective file access pattern.

30. The method of claim 21, wherein associating each file with a respective file encryption group based on the access pattern for each file comprises associating each file with a respective file encryption group based on frequency of access for each file.

31. The method of claim 21, further comprising:
detecting creation of a new file;
searching a data structure that lists file encryption groups and associated encryption keys to find an encryption key for the new file, wherein the searching is based on attributes of the new file; and
encrypting the new file with the encryption key.

32. A computer readable storage medium on which is embedded one or more computer programs, said one or more computer programs implementing a method of optimizing costs associated with managing encrypted data, said one or more computer programs comprising a set of instructions for:
creating a plurality of file encryption groups from a plurality of files;
associating each file with a respective file encryption group based on an access pattern for each file;
associating each file encryption group of said plurality of file encryption groups with a respective encryption key, wherein each file encryption group has multiple files; and
accessing the files in each file encryption group by utilizing said respective encryption key,
wherein creating the plurality of file encryption groups, associating each file with a respective file encryption group, associating each file encryption group with a respective encryption key, and accessing the files in each file encryption group are performed by a file manager module in a user station.

33. The computer readable storage medium in according to claim 32, said one or more computer programs further comprising a set of instructions for:
encrypting each file in each file encryption group of said plurality of file encryption groups with said respective encryption key; and
storing said encrypted files of said plurality of file encryption groups.

34. The computer readable storage medium in according to claim 32, said one or more computer programs further comprising a set of instructions for:
detecting an event; and
dividing files of a selected encryption group into a plurality of sub-groups based on file access patterns for said files of said selected file encryption group.

35. The computer readable storage medium in according to claim 34, said one or more computer programs further comprising a set of instructions for:
generating a respective encryption sub-key for each sub-group of said plurality of sub-groups; and
encrypting each of the files of each sub-group with the respective encryption sub-key.

36. The computer readable storage medium in according to claim 34, said one or more computer programs further comprising a set of instructions for:
moving a file from one sub-group to a second sub-group based on a change in level of activity of said file.

37. The computer readable storage medium of claim 34, the one or more computer programs further comprising a set of instructions for:

comparing a metric for a particular one of the plurality of flies with one or more specified criteria; and in response to the metric failing to satisfy the one or more specified criteria, decrypting the particular file with a first cryptographic key associated with a first of the sub-groups, and encrypting the decrypted particular tile with a second cryptographic key associated with a second of the sub-groups.

38. The computer readable storage medium in according to claim 32, said one or more computer programs further comprising a set of instructions for:

disassociating a file from a first file encryption group based on a change in a respective file access pattern; and associating said file with a second file encryption group based on said change in said respective file access pattern.

39. The computer readable storage medium of claim 32, wherein the access pattern for each file comprises a frequency of access for each file.

* * * * *